United States Patent Office 3,663,601
Patented May 16, 1972

3,663,601
ALLYL-BETA-PHENYLPROPIONATE
Morris Dunkel, Paramus, N.J., assignor to Universal Oil Products Company, Des Plaines, Ill.
No Drawing. Continuation-in-part of application Ser. No. 483,310, Aug. 27, 1965. This application Mar. 26, 1969, Ser. No. 811,691
Int. Cl. C07c 69/76
U.S. Cl. 260—476 R    4 Claims

ABSTRACT OF THE DISCLOSURE

Allyl-beta-phenylpropionate as new compositions of matter and to the use thereof as olfactory ingredients in perfume compositions.

CROSS REFERENCE TO RELATED APPLICATIONS

This is a continuation-in-part of application Ser. No. 483,310, filed Aug. 27, 1965, now abandoned.

DESCRIPTION OF THE INVENTION

This invention relates to novel allyl esters of beta-phenylpropionic acids and to the use thereof as olfactory ingredients in perfume compositions.

The novel allyl phenylpropionates of this invention have the following general structural formula:

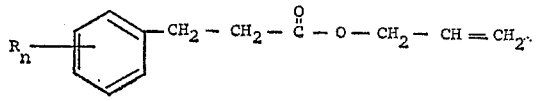

where R is a lower alkyl group and $n$ is an integer of from 0 to 3. Compounds having this general formula have desirable odor properties which render them highly valuable for perfumery use. These odor properties are unique and accordingly render them particularly useful in modern men's odors.

The novel compounds of this invention are prepared according to the process of this invention, in general by transesterifying a lower alkyl ester of a beta-phenylpropionic acid with allyl alcohol in the presence of a transesterification catalyst. The lower alkyl esters of a beta-phenylpropionic acid used in the reaction may be readily prepared by hydrogenating a corresponding alkyl cinnamate such as methyl or ethyl cinnamate in the presence of a suitable hydrogenation catalyst. Examples of alkyl esters of beta-phenylpropionic acids which may be used in the reaction include lower alkyl, such as methyl or ethyl, esters of phenylpropionic acid, methylphenyl propionic acid, dimethylphenylpropionic acid, ethylphenylpropionic acid, (p-ethyl-o-methylphenyl) propionic acid, diisopropylphenylpropionic acid, p - isopropylphenylpropionic acid, or p-tertiarylbutylphenylpropionic acid. The transesterification catalyst used in the reaction comprises a wide class of materials and includes, for example, sodium methylate or an aluminum alkoxide such as aluminum isopropylate. Examples of compounds having highly desirable perfume properties prepared according to the process of this invention by reacting allyl alcohol with an alkyl ester of a beta-phenylpropionic acid of the above illustrated class include allyl beta-phenylpropionate, allyl beta-(methylphenyl) propionate; allyl beta-(p-isopropylphenyl) propionate; or allyl beta-(p-tertiarybutylphenyl) propionate.

The conditions used in effecting the reaction process of this invention are not critical and may be varied over a wide range. Generally, the temperatures used in combination with atmospheric pressures may range from about 50° C. to about 100° C. Conveniently, however, the reaction temperature is maintained at the reflux temperature of the reaction mixture throughout the reaction. The ratio of reactants used in the reaction is not critical and equimolar amounts of allyl alcohol and the alkyl ester of a beta-phenylpropionic acid may be conveniently utilized. The formation of product is generally favored, however, by utilizing an excess of the allyl alcohol and accordingly an excess of the allyl alcohol of up to about 300 percent of theory is preferred. The quantity of the transesterification catalyst used in the reaction may be a catalytic amount which varies depending upon the particular transesterification catalyst used and the reaction rate desired. Generally, a quantity of catalyst ranging from about 0.01 to 50 weight percent of the total weight of the reaction mixture is suitable for most purposes with from about 0.1 to 5 percent being preferred.

In carrying out the process of this invention, which is advantageously effected in a batch-type operation, the desired alkyl ester of a beta-phenylpropionic acid and the allyl alcohol are charged together with an appropriate transesterification catalyst to a suitable reaction vessel, heated to the above described temperature range and maintained thereat until the reaction is complete; a period usually ranging from about 4 to 8 hours. A preferred and highly advantageous manner of effecting the reaction, however, is to continuously remove the alkyl alcohol from the reaction mixture as it forms in order to drive the reaction to completion. This may be readily effected by maintaining the reaction mixture at reflux temperature in an apparatus equipped with an overhead distillation column having condensing means for collecting the alkyl alcohol as it distills from the mixture. When the reaction is complete, the catalyst may be neutralized with a weak acid such as acetic acid, and any remaining alkyl alcohol and excess allyl alcohol distilled from the reaction mixture. The remaining product mixture may then be washed with water and the product extracted therefrom with an organic solvent such as toluene. The product may then be separated from the solvent by fractionation to recover a pure product.

As hereinbefore indicated the compounds of this invention have unique odor properties which render them highly desirable as olfactory ingredients of perfume compositions, particularly for modern men's odors. Allyl-beta-phenylpropionate imparts an apple-apple cider odor and an undertone of berry. This odor is especially useful in perfume compositions to be incorporated in sprays, lotions, cologne, soaps, creams, shaving creams and other toiletry articles used by the male species.

The compounds of this invention may be used to create novel perfume compositions as described above by incorporating the novel compounds, either individually or in admixture, into perfume mixtures. As used herein the term perfume means a mixture of organic compounds including for example alcohols, aldehydes, ketones, esters and frequently also hydrocarbons which are combined in fixed proportions so that the odors of the individual compounds compounds combine to produce a harmonious fragrance. The quantity of the novel compounds of this invention utilized in perfumes may vary within a wide range and depends upon the particular compound used and the particular type of perfume being prepared or improved. For example, the quantity used may range from about 0.1 to 80 percent of the total weight of the perfume with a quantity of about 10 to 30 percent by weight being preferred.

The novel perfume compounds of this invention containing the novel allyl ester of beta-phenylproponic acids as olfactory ingredients may be used per se or incorporated into items such as cosmetic creams, soaps, synthetic detergents, talcum powders or other toilet goods such as shampoos to obtain products having desirable commercial fragrance properties.

The following examples are given to illustrate the compounds of this invention, the preparational process therefor and perfumes containing such compounds as olfactory ingredients. These examples are not, however, intended to limit the generally broad scope of the present invention in strict accordance therewith.

Example I

Allyl beta-phenylpropionate was prepared according to the process of this invention by the following procedure:

About 164 grams (1 mol) of methyl beta-phenylpropionate, about 116 grams (2 mols) of allyl alcohol and 4.9 grams of sodium methylate catalyst were charged to a reaction flask equipped overhead with a short packed column with a reflux splitter. The mixture was heated to reflux temperature starting at about 66° C. and rising up to about 75° C. in about 4 hours. During this period about 24 grams of distillate containing mostly methyl alcohol were recovered. An additional 2.0 grams of the sodium methylate catalyst was then added and the refluxing was continued for about 2 hours to complete the reaction with temperature ultimately rising up to about 95° C. An additional 28.5 grams of distillate were recovered during this period. About 8.5 grams of acetic acid were then added to neutralize the sodium methylate catalyst prior to removing the excess allyl alcohol from the reaction mixture by distillation at a temperature up to about 165° C. After removing about 31 grams of the allyl alcohol, the reaction mixture was then cooled to about 50° C. and mixed with about 100 grams of water and about 100 grams of toluene. The resulting organic layer was separated from the aqueous mixture, washed with water and fractionated to recover about 163 grams of allyl beta-phenylpropionate boiling at 150° C. at 10 mm. Hg and having a refractive index of $n_D^{20}$ 1.5032.

Example II

Allyl beta-(p-tertiarybutylphenyl) propionate is prepared according to the process of this invention by the following procedure:

About 234 grams (1 mol) of ethyl beta-(p-tertiarybutylphenyl) propionate, about 116 grams (2 mols) of allyl alcohol and 5.0 grams of aluminum isopropylate catalyst are charged to a reaction flask equipped overhead with a short packed column with a reflux splitter. The mixture is then heated to reflux temperature and maintained thereat for about 6 hours. The ethyl alcohol which forms during the reaction is continuously removed from the reaction mixture as a distillate. Acetic acid is then added to neutralize the aluminum isopropylate catalyst prior to removing the excess allyl alcohol from the from the reaction mixture by distillation. After removing the allyl alcohol, the reaction mixture is cooled to about 50° C. and mixed with water and toluene. The resulting organic layer is separated from the aqueous mixture, washed with water and fractionated to recover the allyl beta-(p-tertiarybutylphenyl) propionate.

Example III

Allyl beta-(p-isopropylphenyl) propionate is prepared according to the process of this invention by the following procedure:

About 206 grams (1 mol) of methyl beta-(p-isopropylphenyl) propionates, about 116 grams (2 mols) of allyl alcohol and 4.5 grams of sodium methylate catalyst are charged to a reaction flask equipped overhead with a short packed column with a reflux splitter. The mixture is then heated to reflux temperature and maintained thereat for about 6 hours. The methyl alcohol which forms during the reaction is continuously removed from the reaction mixture as a distillate. Acetic acid is then added to neutralize the sodium methylate catalyst prior to removing the excess allyl alcohol from the reaction mixture by distillation. After removing the allyl alcohol, the reaction mixture is cooled to about 50° C. and mixed with water and toluene. The resulting organic layer is separated from the aqueous mixture, washed with water and fractionated to recover the allyl beta-(p-isopropylphenyl)propionate.

Example IV

As hereinbefore set forth, allyl beta-phenylpropionate imparts an apple-apple cider note. This was confirmed by an experienced perfumer who made the evaluation in a conventional manner. The conventional manner entails the use of an air-conditioned room of controlled humidity with the total atmosphere in the room being changed 3 or 4 times a minute. The samples are evaluated through the use of blotters in the conventional manner. The perfumer is a man of many years experience and possesses the competency to distinguish different odors. Of necessity such evaluations are of a subjective character, but are the methods used and accepted in the industry for rating different olfactory compounds.

In one method allyl beta-phenylpropionate is added directly to male toilet goods or, in another method, it is formed as a composition with alcohol, aldehyde, etc. and, when desired, with one or more additional olfactory ingredients, and the resultant perfume composition is incorporated in the male toilet goods. These goods include particularly cologne for men, shaving cream, and after shave lotion.

Example V

As hereinbefore set forth, allyl beta-phenylpropionate possesses a unique odor which is of the apple-apple cider note. This odor may be considered as peculiar because a related compound such as allyl beta-phenylacetate imparts an entirely different odor which has been characterized as jasmin and beeswax.

I claim as my invention:

1. An allyl beta-phenylpropionate having the following structure:

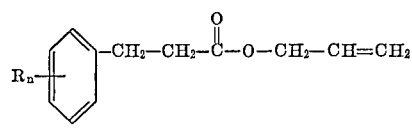

where R is a lower alkyl group and $n$ is an integer of from 0 to 3.

2. Allyl beta-phenylpropionate.
3. Allyl beta-(p-tertiarybutylphenyl) propionate.
4. Allyl beta-(p-isopropylphenyl) propionate.

References Cited

UNITED STATES PATENTS 2,939,879   6/1960   De Benedictis _____ 260—476
2,207,611   7/1940   Coleman et al. _____ 260—476

OTHER REFERENCES

Robertson et al., Jour.-Chem. Soc., London 1937, pp. 335-343 QD1C6.

JAMES A. PATTEN, Primary Examiner

R. S. WEISSBERG, Assistant Examiner

U.S. Cl. X.R.

252—522